United States Patent [19]

Chaplin et al.

Best Available Copy

[11] E Re. 30,311

[45] Reissued Jun. 24, 1980

[54] APPARATUS AND METHOD FOR EXTERNALLY TESTING CONDUIT CONNECTIONS

[75] Inventors: Gervase M. Chaplin, Jefferson; Thomas W. Childers, St. Tammany, both of La.

[73] Assignee: Exxon Production Research Company, Houston, Tex.

[21] Appl. No.: 41,028

[22] Filed: May 21, 1979

Related U.S. Patent Documents

Reissue of:

[64] Patent No.: 4,019,371
Issued: Apr. 26, 1977
Appl. No.: 652,969
Filed: Jan. 28, 1976

[51] Int. Cl.[2] ..... G01M 3/28
[52] U.S. Cl. ..... 73/46; 73/49.8
[58] Field of Search ..... 73/46, 40, 49.8, 49.5

[56] References Cited

U.S. PATENT DOCUMENTS

| | | | |
|---|---|---|---|
| 2,350,867 | 6/1944 | Bean et al. | 73/46 |
| 2,460,238 | 1/1949 | Penick | 73/46 |
| 2,478,628 | 8/1949 | Hansen | 73/46 |

FOREIGN PATENT DOCUMENTS

| | | | |
|---|---|---|---|
| 854189 | 11/1960 | United Kingdom | 73/46 |
| 952755 | 3/1964 | United Kingdom | 73/46 |

*Primary Examiner*—Donald O. Woodiel
*Attorney, Agent, or Firm*—John S. Schneider

[57] ABSTRACT

Apparatus and method are disclosed for externally testing flanged or hubbed connections used on fluid conducting conduits. A ring gasket fits between the faces of the connecting flanges or hubs to effect a fluid tight seal. A test ring also fits between the faces of the hub or flange connection in a manner so as to form a space between the test ring and the ring gasket. Seal means closes the space between the test ring and the faces of the flanges or hubs. The outside diameter of the test ring is confined within fastening means which secures the hubs or flanges together. Fluid under pressure, used to test the effectiveness of the ring gasket seal, is applied to the space between the ring gasket and the test ring seal means. The pressure in that space falls when the ring gasket is defective but remains constant if the ring gasket is sound. Following the test, fluid pressure is bled off the space between the ring gasket and the test ring seal means. The test fluid pressure is applied to and bled from such space through a pressure port or passageway formed in the test ring or in one of the flanges or hubs.

16 Claims, 10 Drawing Figures

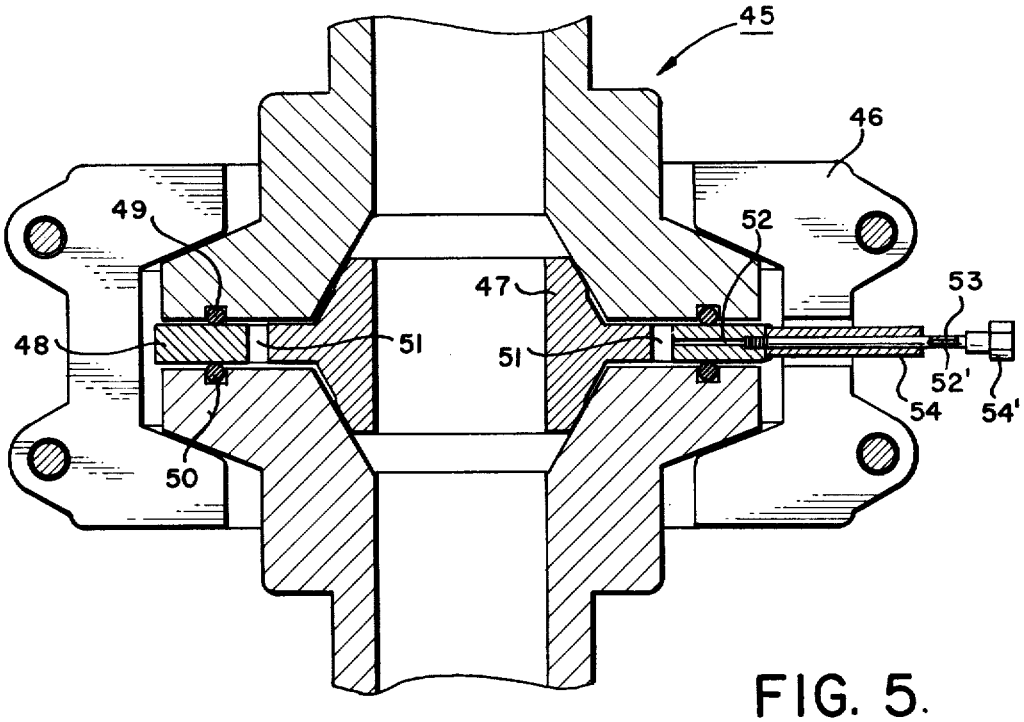
FIG. 5.
FIG. 6.
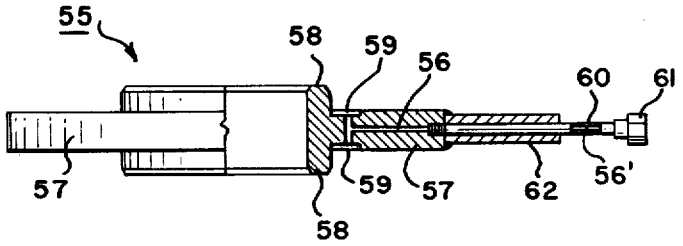
FIG. 7.
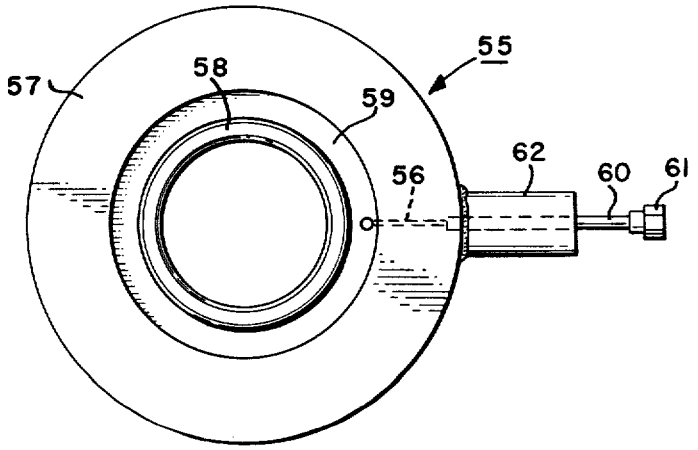

APPARATUS AND METHOD FOR EXTERNALLY TESTING CONDUIT CONNECTIONS

Matter enclosed in heavy brackets [ ] appears in the original patent but forms no part of this reissue specification; matter printed in italics indicates the additions made by reissue.

BACKGROUND OF THE INVENTION

Flanged or hubbed connections which connect together conduits for carrying fluids are conventionally tested by applying internal pressure to the seal elements and checking for signs of external leaks. However, it is often inconvenient, costly and/or impossible to perform such a test immediately after the connection is made, as for example, following installation of a pipeline riser or a subsea tie-in or a connection to a multiported vessel in offshore oil and gas drilling and production operations. It is advantageous to know that the ring gasket constituting the seal element in the connection has been properly installed and a sound seal obtained as soon as the connection is made.

The present invention permits evaluation of a seal in a flanged or hubbed connection between fluid carrying conduits through the application of external pressure to the seal immediately after the connection is made.

BRIEF DESCRIPTION OF THE INVENTION

A connection between fluid conducting conduits includes a ring gasket fitted between the faces of the halves of the connection and a test ring also fitted between the faces of the halves of the connection and surrounding the ring gasket. Seal means close off the spaces between the faces of the halves of the connection and the test ring. An annular space is formed between the ring gasket and test ring seal means. The outside diameter of the test ring fits within the means securing the halves of the connection together. A port or passageway formed in the test ring or in one of the halves of the connection extends from the annular space to the exterior of the connection. The exterior end of the port is connected to a source of fluid pressure. The exterior end of the port may be connected to a nipple which, in turn, is connected to the source of fluid pressure. When the port is formed in the test ring the nipple may also serve as a handle for inserting the test ring into and removing the test ring from the connection. The test ring may be made integral with the ring gasket or may be glued to it or may be arranged completely separate from it.

In conducting a test of the ring gasket after the port is connected to the source of fluid pressure, fluid pressure is applied to the annular space through the port to test the ring gasket. After the test, the fluid pressure in the annular space is bled off and the fluid pressure source disconnected from the port.

BRIEF DESCRIPTION OF THE DRAWINGS

FIG. 5 illustrates another embodiment of the invention in which the test ring of FIG. 1 is arranged in a hubbed connection and O-rings are positioned on the hubs;

FIGS. 6 and 7 illustrate side and top views, respectively, partly in section, of the seal ring (gasket) and test ring of FIGS. 1 and 2 formed integrally;

DESCRIPTION OF THE PREFERRED EMBODIMENTS

Figure 1:
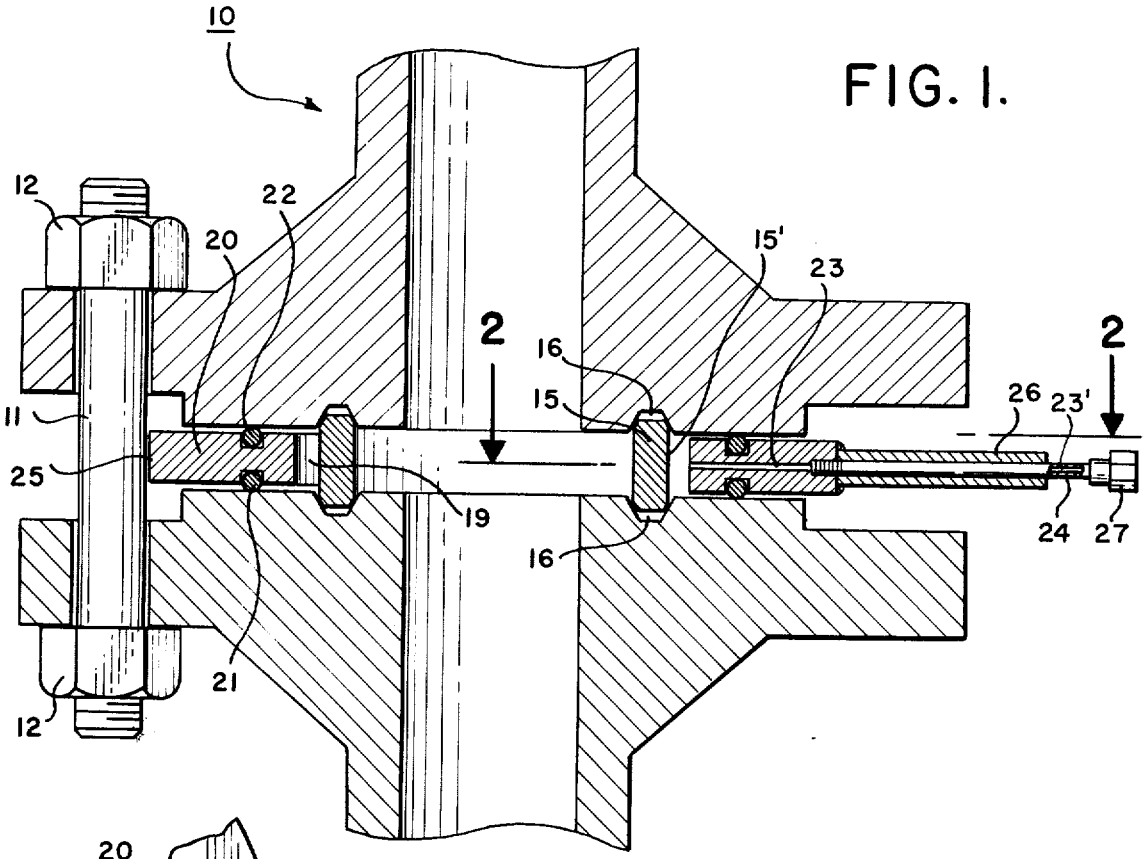
FIG. 1 illustrates one embodiment of the invention in which a test ring, having a pressure port therethrough, is arranged in a flanged connection and O-rings are positioned on the test ring.
Figure 2:
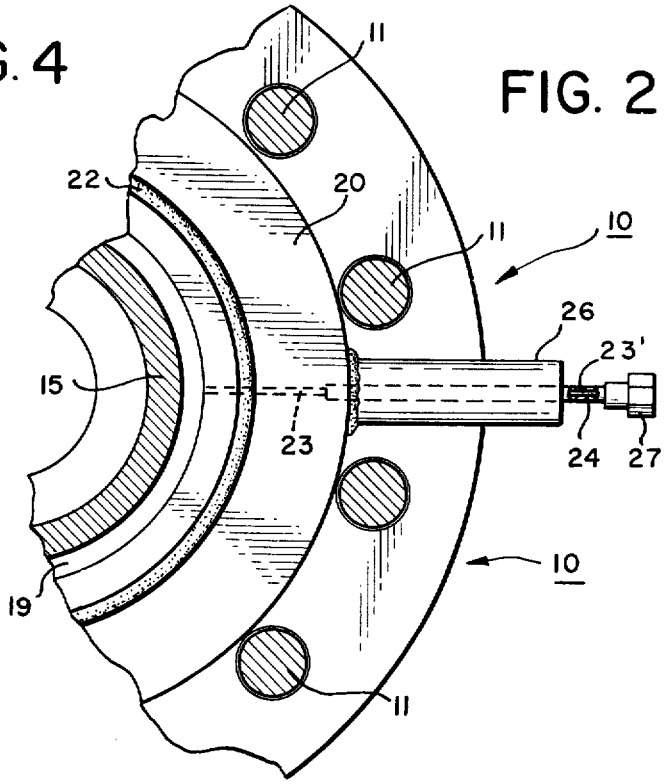
FIG. 2 is a view taken along lines 2—2 of FIG. 1.

Referring to FIGS. 1 and 2 there is shown a flanged connection or coupling 10 having halves thereof bolted together by a series of studs 11 on which nuts 12 have been threaded. These studs are arranged in a circular pattern as shown in FIG. 2. A gasket in the form of a metal seal ring 15 is positioned between the flange halves in circular grooves 16 formed in the faces of the flange halves. A metal test ring 20 is also positioned between the flange halves. Test ring 20 contains O-ring seals 21 and 22 arranged thereon to seal off the space between the flange halve faces and test ring 20 to form a closed annular space 19 between outer diameter 15' of seal ring 15 and O-rings 21 and 22. The outer diameter 25 of test ring 20 is sized to fit inside the bolts in a bolted flange (or inside the clamp on a clamped hub connection as indicated in FIG. 5). Test ring thickness is machined to match the standard separation between flanges (or hubs) after the bolts (or clamps) are fully tightened. Test ring 20 contains a pressure port 23 which opens into annulus 19. A nipple 24 (shown in FIG. 1 sealingly threaded into the test ring) provides an extension port 23' of pressure port 23. A protector sleeve 26 surrounds a portion of nipple 24. A tubing connector fitting 27 is attached to the outer end of nipple 24 which protrudes between flange bolts 11, as shown. Nipple 24, together with protector sleeve 26, may serve as a handle to insert and arrange test ring 20 in and remove it from the connection.

Figure 3:
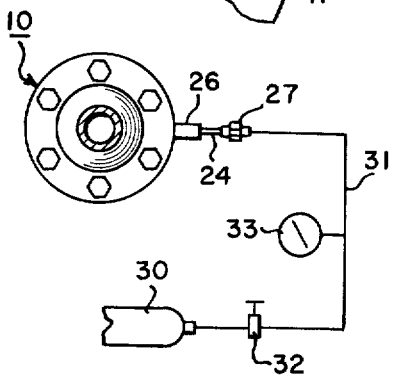
FIG. 3 is a schematic illustration of a test apparatus assembly connected to the flanged connection of FIG. 1.

As illustrated in FIG. 3 fitting 27 is connected to a source of fluid under pressure 30 through a hose or conduit 31 in which is connected a valve 32 for controlling flow of pressure fluid through hose 31 and a pressure gauge 33 for measuring pressure in hose 31.

In the operation of the apparatus illustrated in FIGS. 1 and 2 ring gasket 15 and test ring 20 are installed between the faces of the flange halves 10, as shown, and the connection of the flange halves is made by tightening nuts 12 on studs 11. Fluid under pressure is introduced into extension port 23', port 23 and annulus 19 through hose 31 and open valve 32 from source 30 resulting in pressure buildup in annulus 19. Valve 32 is then closed trapping fluid pressure in annulus 19. If the seal formed by seal ring 15 is defective, fluid will leak from the annulus 19 and pressure in the annulus will fall and be so indicated on pressure gauge 33. However, if the seal is sound the pressure in the annulus will remain constant which also will be indicated on pressure gauge 33.

After the test has been completed fluid pressure in annulus 19 is bled off and hose 31 is disconnected. Nipple 24 may then be left intact to serve as a weep hole for long life leak monitoring or it may be cut off leaving the connection area uncluttered if that is desired.

Figure 4:
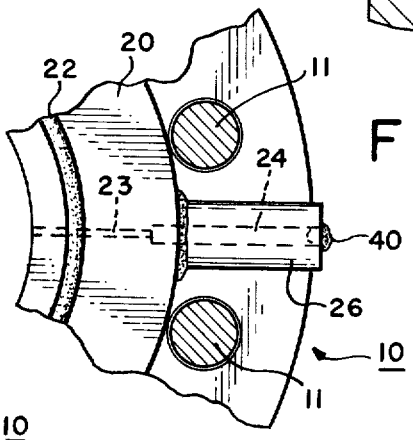
FIG. 4 is a view similar to FIG. 2 illustrating severance of a portion of the nipple and its protector sleeve and plugging of the nipple.

As shown in FIG. 4 a further alternative is to seal the nipple. The test nipple 24 and sleeve 26 are severed at the point they protrude from the flanges and nipple 24 is welded shut at the outer edge of the nipple protector sleeve 26 as shown by plug 40. In that manner a backup resilient seal (the O-rings) is provided for the seal effected by seal ring 15.

Figure 10:
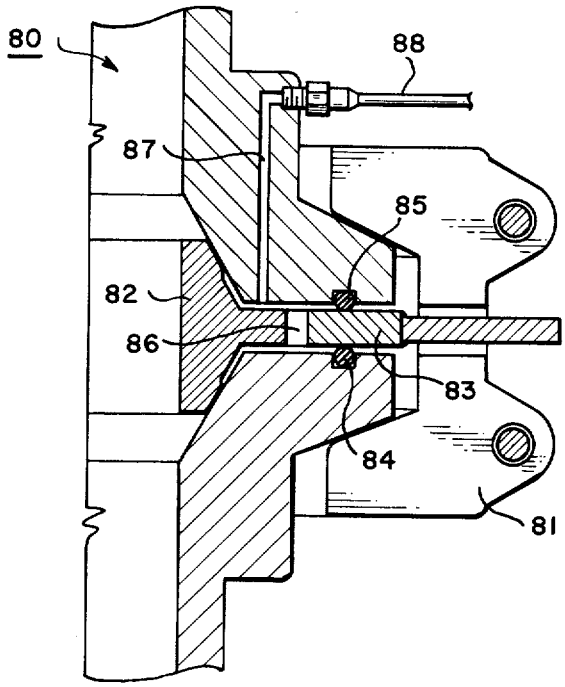
FIG. 10 illustrates still another embodiment of the invention in which a test ring is arranged in a hubbed connection having a pressure port therethrough.

In the event there is insufficient clearance between the flange or hub faces for the O-ring grooves and the pressure port, one or both of the O-rings may be installed in the flange or hub faces instead of in the test ring, as illustrated in FIG. 5, or the test port may be drilled through one of the flanges or hubs, as illustrated in FIG. 10. Referring to FIG. 5 there is shown a hubbed connection or coupling 45 having the halves thereof clamped together by clamp means 46. A double cone metal seal ring or gasket 47 seals off the connection. A metal test ring 48 is positioned between the faces of the hub halves. O-rings 49 and 50 are located in grooves formed in the faces of hub members 45 to seal off the space between those faces and test ring 48 to form an annular space 51 between gasket 47 and O-rings 49 and 50. The test ring is provided with a pressure port 52 which connects to annular space 51. A nipple 53 containing an extension port 52' is connected to test ring 48, as shown. Nipple 53 is protected by a sleeve 54 and is also provided with a connector fitting 54' which connects to a hose 31 in the same manner hose 31 is connected to connector fitting 27 as described with respect to FIGS. 1 and 2, above. The test operation is also the same as the test operation described with respect to those figures.

The seal ring may be manufactured integral with the test ring as illustrated in FIGS. 6 and 7. When so made the combined gasket or seal ring and test ring 55 contains a pressure port 56 in the test ring section 57 thereof, which is open to an annular space 59, formed by an undercut or recessed surface in member 55, located between the seal ring section 58 thereof and the O-ring seals, not shown. A nipple 60 contains a connection fitting 61 for hose 31 and an extension port 56' of port 56. Nipple 60 is connected to section 57 and is surrounded by a nipple protector 62 in the same manner as is described above with respect to the embodiment of FIGS. 1 and 2. The integral test ring is particularly useful in subsea operations for the test ring section acts as a centralizing ring for the seal ring section making the task of locating the seal ring in grooves 16 of flanges 10, for example, (see FIG. 1) extremely easy and minimizes the chances of damaging the seal ring. More specifically, the outside diameter of the test ring fits just inside the bolt circle of the flange connection. The inside diameter of the test ring is slightly (e.g. 1/16 inch) larger than the outside diameter of the seal ring or gasket to assure proper positioning of the gasket. Thus, when three or four bolts have been installed in the connection, the test ring and the gasket are inserted together between the flanges or hubs and pushed against the bolts. This action automatically positions the gasket. Subsequent bolts cannot be installed unless the gasket (and test ring) are in proper position. This arrangement is particularly useful for making underwater connections where visibility is poor.

Figure 8:
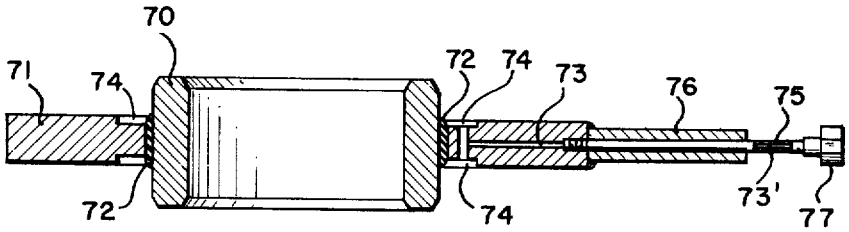
FIGS. 8 and 9 illustrate side and top views, respectively, partly in section, of the seal ring (gasket) and test ring of FIGS. 1 and 2 formed by gluing the test ring to the gasket.
Figure 9:
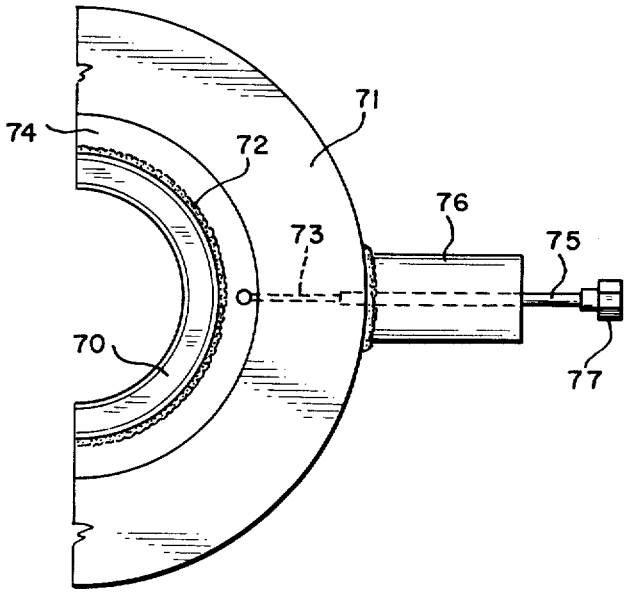

Also, the seal ring may be attached to the test ring by gluing one to the other with a resilient compound such as a silicon rubber adhesive. Such structure is illustrated in FIGS. 8 and 9 where there is shown a seal ring 70 glued to a test ring 71 by adhesive material 72. Test ring 71 contains a port 73 which is connected to an annular space 74 formed by undercutting or recessing test ring 71 adjacent seal ring 70. As similarly disclosed in other Figures a nipple 75 provided with a pressure port extension 73' and surrounded by a protective sleeve 76 welded thereto is threaded to test ring 71, as shown, and is provided with a suitable connection fitting 77.

The test port may be drilled through one of the flanges or hubs instead of being provided in the test ring and the nipple "handle," when the latter is included. Referring to FIG. 10 there is shown a hubbed connection or coupling 80 having halves thereof clamped together by clamp means 81. A double cone metal seal ring or gasket 82 seals off the connection. A metal test ring 83 is positioned between the faces of the hub halves. O-rings 84 and 85 are located in grooves formed in the faces of members 80 to seal off the space between the hub halve faces and test ring 83 to form an annular space 86 between gasket 82 and O-rings 84 and 85. The upper half of the hub halves 80 contains a pressure port 87 which extends from annular space 86 to the exterior thereof and is connected to a conduit 88 (which may be a nipple such as member 76 of FIG. 8) which in turn is connected to a suitable source of fluid pressure 30 as illustrated in FIG. 3.

It should be clear that when the seal ring and test ring are manufactured integral as illustrated in FIGS. 6 and 7 or are attached to each other by an adhesive as illustrated in FIGS. 8 and 9 they may be used with either the hub type or flange type connection. Also, the seals may be formed on the test ring or on the flange or hub members whether the test ring is separate from the seal ring, attached to the seal ring or formed integral with the seal ring. In addition, the sealing members and other components while preferably made of metallic materials may be made of nonmetallic materials. Other variations and modifications of the invention described herein may be made without departing from the scope of the invention as defined in the appended claims.

Having fully described the method, apparatus, advantages and objects of our invention we claim:

[1. Apparatus for testing a connection between fluid conducting conduits employing an external source of fluid pressure comprising:

ring seal means in said connection for sealing off and preventing flow of fluids into and from said conduits when said connection is made;

test ring seal means in said connection, said test ring seal means and said ring seal means forming a space therebetween; and passageway means connecting said space to the exterior of said connection for transmitting fluid pressure from said source of fluid pressure to said space.]

[2. Apparatus as recited in claim 1 in which said test ring seal means includes O-rings for sealing off the space between said test ring seal means and said connecting conduits.]

[3. Apparatus as recited in claim 2 including means connecting said passageway means to said source of fluid pressure.]

[4. Apparatus as recited in claim 3 including means for measuring fluid pressure in said closed space.]

[5. Apparatus as recited in claim 4 in which said test ring seal means contains said passageway means; said apparatus including a nipple extending external of said connection and having a passageway connected to said passageway means.]

[6. Apparatus as recited in claim 4 in which said connection includes two connector halves, said passageway means being formed in at least one of said halves.]

[7. Apparatus for testing a connection between fluid conducting conduits employing an external source of fluid pressure, said connection including ring seal means in said connection for sealing off and preventing flow of fluids into and from said conduits when said connection is made comprising:

test ring seal means in said connection spaced from said ring seal means to form a closed space therebetween, said test ring seal means containing a port open to said space and including a nipple extending external of said connection and having a passageway connected to said port for transmitting fluid pressure from said source of fluid pressure to said port.]

[8. Apparatus as recited in claim 7 in which said test ring seal means includes O-rings for sealing off the space between said test ring seal means and said connecting conduits.]

[9. Apparatus as recited in claim 8 including means connecting said nipple to said source of fluid pressure.]

[10. Apparatus as recited in claim 9 including means for measuring fluid pressure in said closed space.]

[11. Apparatus as recited in claim 10 wherein said connection includes two hub halves and means for securing said hub halves together.]

[12. Apparatus as recited in claim 11 in which said ring seal means comprises a conical wedge-type seal for sealing off against the faces of said hub halves.]

[13. Apparatus as recited in claim 10 wherein said connection comprises two flange halves and means for securing said flange halves together.]

[14. Apparatus as recited in claim 13 wherein said flange halves are provided with grooves, said ring seal means being arranged in said grooves.]

[15. A method for externally testing a connection between fluid conducting conduits comprising the steps of:

installing ring seal means in said connection for sealing off and preventing leaks through said connection when said connection is made;

installing a test ring seal in said connection surrounding said ring seal means to form a closed annulus between said test seal ring and said ring seal means;

connecting a source of fluid pressure to passageway means which extends from said closed annulus to the exterior of said connection;

applying fluid pressure to said passageway means;

shutting off the source of fluid pressure; and then measuring the fluid pressure in said closed annulus.]

[16. A method as recited in claim 15 comprising releasing fluid pressure from said annulus.]

[17. A method for externally testing a connection between fluid conducting conduits, said connection including ring seal means for sealing off and preventing leaks through said connection when said connection is made comprising the steps of:

installing a test ring seal in said connection surrounding said ring seal means to form a closed annulus between said test ring seal and said ring seal means, said test seal ring having a pressure port;

connecting a source of fluid pressure to said pressure port;

applying fluid pressure to said pressure port;

shutting off the source of fluid pressure; and then measuring the fluid pressure in said annulus.]

[18. A method as recited in claim 17 comprising: releasing fluid pressure from said annulus.]

[19. A method as recited in claim 18 including the steps of: after releasing fluid pressure from said annulus, cutting off a test nipple, which contains a port connected to said pressure port and which extends beyond the outer rim of said connection, adjacent the outer rim of said connection and then welding shut said port in said test nipple.]

*20. Apparatus for use in testing a connection between fluid conductive conduits, said connection having two mateable flanges, each of which contains a circle of alignable bolt holes comprising:*

*a seal ring for engaging the surface of and sealing off the spaces between said flanges to prevent flow of fluids into and from said conduits via said flange connection;*

*a test ring having seal means for sealing off the spaces between said flange faces and said test ring, said test ring and said seal ring forming a one-piece unit;*

*an annular space formed between said seal ring, said seal means on said test ring and said mateable flange faces; and*

*a passageway for communicating test fluid under pressure to said annular space for testing the effectiveness of said seal ring and said seal means, said test ring having a greater diameter than said seal ring with the outside diameter of said test ring being about the same diameter as the inside diameter of said circle of bolt holes in said flanges.*

*21. Apparatus as recited in claim 20 including means connected to said passageway for measuring fluid pressure in said annular space.*

*22. Apparatus as recited in claim 21 including a circular groove formed in each flange for receiving said seal ring.*

*23. Apparatus as recited in claim 22 including a nipple extending external of said connection and connected to said port means.*

*24. Apparatus as recited in claim 23 in which said seal means comprises O-rings for sealing off the spaces between said flanges.*

*25. Apparatus as recited in claim 24 in which said passageway extends through said test ring.*

*26. Apparatus as recited in claim 25 including a source of fluid pressure connected to said passageway for supplying fluid pressure to said annular space.*

*27. Apparatus as recited in claim 24 in which said passageway extends through one of said flanges.*

*28. Apparatus as recited in claim 27 including a source of fluid pressure connected to said passageway for supplying fluid pressure to said annular space.*

*29. A method for testing a connection between fluid conducting conduits, said connection including two matable flanges each having a circle of alignable bolt holes comprising the steps of:*

*inserting at least one bolt through at least one set of aligned holes in said flanges;*

*inserting test sealing apparatus between said flanges, said sealing apparatus including a seal ring for sealing off the spaces between said flanges to prevent flow of fluids into and from said conduits and a test ring,*

*formed integral with said seal ring, for sealing off the spaces between said flanges, said test ring and said seal ring having an annular space therebetween, said test ring having a greater diameter than said seal ring with the outside diameter of said test ring being about the same diameter as the inside diameter of said circle of bolt holes in said flanges;*

*manipulating said sealing apparatus, including pushing said sealing apparatus against said bolt, until the outside diameter of said test ring is positioned within the diameter of said circle of bolt holes;*

*inserting bolts through said remaining sets of aligned bolt holes;*

*securing said flanges together;*

*applying fluid pressure to said annular space;*

*shutting off said fluid pressure; and then measuring the fluid pressure in said annular space.*

*30. A method as recited in claim 29 including inserting several bolts through sets of aligned holes in said flanges prior to inserting said test sealing apparatus, the outside diameter of said test ring being positioned within the diameter of said bolt holes by pushing sail sealing apparatus against said several inserted bolts.*

*31. A method as recited in claim 30 comprising:*

*releasing fluid pressure from said annular space.*

*32. A method as recited in claim 31 in which said fluid pressure is applied through a passageway extending through said test ring.*

*33. A method as recited in claim 32 in which a nipple is connected to said passageway and including the steps of cutting off said nipple adjacent the outer rim of said connection after releasing pressure from said annular space and then welding said nipple closed.*

*34. A method as recited in claim 31 in which said fluid pressure is applied through a passageway in one of said flanges.*

*35. A method as recited in claim 34 in which a nipple is connected to said passageway and including the steps of cutting off said nipple adjacent the outer rim of said connection after releasing pressure from said annular space and then welding said nipple closed.*

* * * * *